United States Patent
Du et al.

(10) Patent No.: US 11,804,036 B2
(45) Date of Patent: Oct. 31, 2023

(54) PERSON RE-IDENTIFICATION METHOD BASED ON PERSPECTIVE-GUIDED MULTI-ADVERSARIAL ATTENTION

(71) Applicant: WUHAN UNIVERSITY, Hubei (CN)

(72) Inventors: Bo Du, Hubei (CN); Fangyi Liu, Hubei (CN); Mang Ye, Hubei (CN)

(73) Assignee: WUHAN UNIVERSITY, Hubei (CN)

( * ) Notice: Subject to any disclaimer, the term of this patent is extended or adjusted under 35 U.S.C. 154(b) by 0 days.

(21) Appl. No.: 18/311,858

(22) Filed: May 3, 2023

(65) Prior Publication Data
US 2023/0267725 A1  Aug. 24, 2023

Related U.S. Application Data

(63) Continuation of application No. PCT/CN2021/122342, filed on Sep. 30, 2021.

(30) Foreign Application Priority Data

Jan. 27, 2021 (CN) .......................... 202110108895.0

(51) Int. Cl.
*G06K 9/00* (2022.01)
*G06V 10/82* (2022.01)
(Continued)

(52) U.S. Cl.
CPC ............... *G06V 10/82* (2022.01); *G06T 7/11* (2017.01); *G06V 10/25* (2022.01); *G06V 10/44* (2022.01);
(Continued)

(58) Field of Classification Search
CPC ...... G06V 10/82; G06V 10/25; G06V 10/761; G06V 10/44; G06V 10/764; G06T 7/11; G06T 2207/20081; G06T 2207/20084
(Continued)

(56) References Cited

U.S. PATENT DOCUMENTS

2020/0134804 A1    4/2020 Song et al.

FOREIGN PATENT DOCUMENTS

| CN | 110659589 | 1/2020 |
|---|---|---|
| CN | 110706793 | 1/2020 |
| CN | 111881716 | 11/2020 |

OTHER PUBLICATIONS

Sindagi, Vishwanath A., and Vishal Patel. "Dafe-fd: Density aware feature enrichment for face detection." 2019 IEEE Winter Conference on Applications of Computer Vision (WACV). IEEE, 2019. (Year: 2019).*

(Continued)

*Primary Examiner* — Jonathan S Lee
(74) *Attorney, Agent, or Firm* — JCIP GLOBAL INC.

(57) ABSTRACT

A person re-identification method based on a perspective-guided multi-adversarial attention is provided. The deep convolutional neural network includes a feature learning module, a multi-adversarial module, and a perspective-guided attention mechanism module. The multi-adversarial module is followed by a global pooling layer and a perspective discriminator after each stage of a basic network of the feature learning module. The perspective-guided attention mechanism module is an attention map generator and the perspective discriminator. The training of the deep convolutional neural network includes learning of the feature learning module, learning of the multi-adversarial module, and learning of the perspective-guided attention mechanism module. The proposed method uses the trained deep convolutional neural network to extract features of the testing images, and using an Euclidean distance to perform feature matching on images in a query set and images in a gallery set.

8 Claims, 3 Drawing Sheets

(51) Int. Cl.
  *G06T 7/11* (2017.01)
  *G06V 10/25* (2022.01)
  *G06V 10/74* (2022.01)
  *G06V 10/44* (2022.01)
  *G06V 10/764* (2022.01)
(52) U.S. Cl.
  CPC .......... *G06V 10/761* (2022.01); *G06V 10/764* (2022.01); *G06T 2207/20081* (2013.01); *G06T 2207/20084* (2013.01)
(58) Field of Classification Search
  USPC ........................................................ 382/156
  See application file for complete search history.

(56) References Cited

OTHER PUBLICATIONS

Jia, Yunpei, et al. "Single-side domain generalization for face anti-spoofing." Proceedings of the IEEE/CVF Conference on Computer Vision and Pattern Recognition. 2020. (Year: 2020).*
"International Search Report (Form PCT/ISA/210) of PCT/CN2021/122342", dated Jan. 5, 2022, with English translation thereof, pp. 1-8.
"Written Opinion of the International Searching Authority (Form PCT/ISA/237) of PCT/CN2021/122342," dated Jan. 5, 2022, with English translation thereof, pp. 1-9.
Luo Hao et al., "A Survey on Deep Learning Based Person Re-identification," Acta Automatica Sinica, vol. 45, Nov. 2019, pp. 1-36.
Yifan Sun et al., "Beyond Part Models: Person Retrieval with Refined Part Pooling (and a Strong Convolutional Baseline)," Proceedings of the European Conference on Computer Vision (ECCV), Jan. 2018, pp. 1-17.
Mang Ye et al., "Deep Learning for Person Re-identification: A Survey and Outlook," arXiv:2001.04193, Jan. 2021, pp. 1-20.
Lingxiao He et al., "FastReID: A Pytorch Toolbox for General Instance Re-identification," arXiv:2006.02631, Jul. 2020, pp. 1-10.
Jie Hu et al., "Squeeze-and-Excitation Networks," 2018 IEEE/CVF Conference on Computer Vision and Pattern Recognition, Jun. 2018, pp. 7132-7141.
Binghui Chen et al., "Mixed High-Order Attention Network for Person Re-Identification," 2019 IEEE/CVF International Conference on Computer Vision (ICCV), Aug. 2019, pp. 371-381.
Tianlong Chen et al., "ABD-Net: Attentive but Diverse Person Re-Identification," 2019 IEEE/CVF International Conference on Computer Vision (ICCV), Aug. 2019, pp. 8351-8361.
Zuozhuo Dai et al., "Batch DropBlock Network for Person Re-identification and Beyond," Conference: 2019 IEEE/CVF International Conference on Computer Vision (ICCV), Oct. 2019, pp. 3691-3701.
Xuesong Chen et al., "Salience-Guided Cascaded Suppression Network for Person Re-Identification," Conference: 2020 IEEE/CVF Conference on Computer Vision and Pattern Recognition (CVPR), Jun. 2020, pp. 3300-3310.
Mang Ye et al., "Deep Learning for Person Re-Identification: A Survey and Outlook," IEEE Transactions on Pattern Analysis and Machine Intelligence, vol. 44, Jun. 2022, pp. 2872-2893.
Kuan Zhu et al., "Identity-Guided Human Semantic Parsing for Person Re-identification," In book: Computer Vision—ECCV 2020, Dec. 2020, pp. 346-363.

* cited by examiner

PERSON RE-IDENTIFICATION METHOD BASED ON PERSPECTIVE-GUIDED MULTI-ADVERSARIAL ATTENTION

This application is a continuation-in-part of international application of PCT application serial no. PCT/CN2021/122342 filed on Sep. 30, 2021, which claims the priority benefit of China application no. 202110108895.0 filed on Jan. 27, 2021. The entirety of each of the abovementioned patent applications is hereby incorporated by reference herein and made a part of this specification.

BACKGROUND

Technical Field

The invention belongs to the technical field of surveillance video retrieval, and in particular, relates to a person re-identification method based on perspective-guided multi-adversarial attention.

Description of Related Art

In recent years, person re-identification has been widely used in person tracking and criminal investigation search. Person re-identification technology is to associate the same person in different places and at different times under the condition of cross-camera. In practical application scenarios, when it is necessary to search for a target person, the person re-identification technology matches the target person with the person image set contained in the video to be searched, and takes the person image most similar to the target person as the search result. Specifically, the person re-identification method mainly combines computer vision technology to learn the characteristics of persons, and designs appropriate metrics for feature matching, to search for target persons.

Learning robust features is very important to improve the performance of person re-identification algorithms, and changes in person posture, camera perspective, background occlusion, illumination changes, and image resolution changes will all cause feature distortion. Therefore, how to learn robust features that can resist various changes is a research hotspot in the current person re-identification problem.

The current mainstream person re-identification algorithms are all based on the deep learning network framework. Deep learning combines person feature learning and measurement to form an end-to-end network, which greatly improves the performance of person re-identification algorithms. The basic training and testing steps of a deep convolutional neural network are as follows:
1. Prepare the data and divide the data set into the training set and test set.
2. Put the data of the training set into the deep convolutional neural network for training, including the construction of the basic network, the construction of triplets, and loss optimization.
3. Use the trained model to perform feature extraction and feature matching on the images in the query set and test set.

Adversarial learning uses a generator and a discriminator to form an adversarial model. The generator aims to generate realistic samples as much as possible so that the generated samples cannot be distinguished by the discriminator, and the discriminator aims to distinguish the generated samples from the real samples as much as possible. Therefore, the method makes the generated samples as close as possible to the real samples in an adversarial manner.

The attention mechanism can highlight informative regions and suppress noisy patterns. According to the scope of the attention mechanism, it can be divided into three categories: 1) Spatial domain attention extracts key information through spatial transformation. 2) Channel-domain attention considers the inter-channel dependencies and adjusts channel weights accordingly. 3) Hybrid domain attention is a combination of spatial domain and channel domain attention, which pays attention to the spatial information and channel information of features at the same time.

At present, the attention mechanism has gradually become popular in the field of person re-identification, and the method based on the attention mechanism has also achieved good performance. But the current methods have two limitations: 1) The existing attention mechanism is only supervised in the final stage after combining with features. The learning of the attention map lacks direct supervision, so it is difficult to judge whether the learned attention map is beneficial to the final expression. 2) Existing attention strategies focus on designing complex structures while ignoring important camera ID information, making the learned feature representation sensitive to perspective changes.

SUMMARY

Aiming at the problems of existing techniques, the technical problem to be solved by the present invention is to improve the existing person re-identification method based on the attention mechanism. A person re-identification method based on perspective-guided multi-adversarial attention is proposed. Borrowing the idea of adversarial learning, the perspective information is introduced into the attention mechanism, and the learning of the attention mechanism is directly supervised and considered whether it can capture the informative and perspective-independent identity-relevant parts.

The technical problem to be solved by the present invention is realized by such a technical scheme, and it comprises:
  Step 1. Build a Deep Neural Network
  The deep convolutional neural network mainly includes a feature learning module, a multi-adversarial module, and a perspective-guided attention mechanism module. The feature learning module adopts a variety of basic models based on the ResNet50 network, and inputs person images for feature learning to obtain features; the described multi-adversarial module is connected with a global pooling layer and a perspective discriminator after each residual block of the basic ResNet50; the perspective-guided attention mechanism module is mainly an attention map generator and a perspective discriminator;
  Step 2. Training of Deep Convolutional Neural Network
    1) data preparation: prepare person images, input person images and corresponding identity labels, and divide the person images into two parts as training images and test images;
    2) send the training images to the deep convolutional neural network for training
  This step includes feature learning of the feature learning module, feature learning of multi-adversarial module, and feature learning of perspective-guided attention mechanism module.
  Feature learning is: inputting the training images into the built deep convolutional neural network, and outputting the deep feature representations of the feature. This part uses triplet loss as well as classification loss for supervision.

The multi-adversarial module learning is: adding global pooling to each residual block of the original feature learning network to obtain each low-level, middle-level, and high-level feature, and using the perspective discriminator to supervise these features so that the final deep feature expression is more robust. This part supervises the features using a perspective classification loss.

The perspective-guided attention mechanism is: adding an attention mechanism based on the original deep feature learning network, and supervises the learning of the attention mechanism so that the generated attention map can capture rich semantic information and areas that resist perspective changes. This part uses the perspective classification loss to supervise the attention map.

3) network optimization and parameter update

The update includes two parts, forward propagation, and backpropagation. The forward propagation calculates the outputs and losses through the network, and then the gradients of the losses are reversed during the backpropagation process, thereby updating the network.

Step 3. Testing of Deep Convolutional Neural Networks

Use the trained network to extract the features of the test images, and use the Euclidean distance to match the features of the query and the images in the gallery.

The technical effect of the present invention is:
1. Apply adversarial learning to the person re-identification network, supervise the features of each stage, enhance the perspective invariance of the features, and make the final learned global features more robust.
2. The proposed perspective attention mechanism improves the traditional attention mechanism, directly supervises the learning of the attention mechanism and pays attention to whether the area captured by the attention map can resist the change of perspective, and improves the performance of the attention mechanism.

The advantages of the present invention are: 1) The learning of the attention mechanism is directly supervised, which improves the performance of the attention mechanism. 2) It is easy to integrate into various basic models and can improve the performance of these models.

DESCRIPTION OF THE EMBODIMENTS

Figure 1:
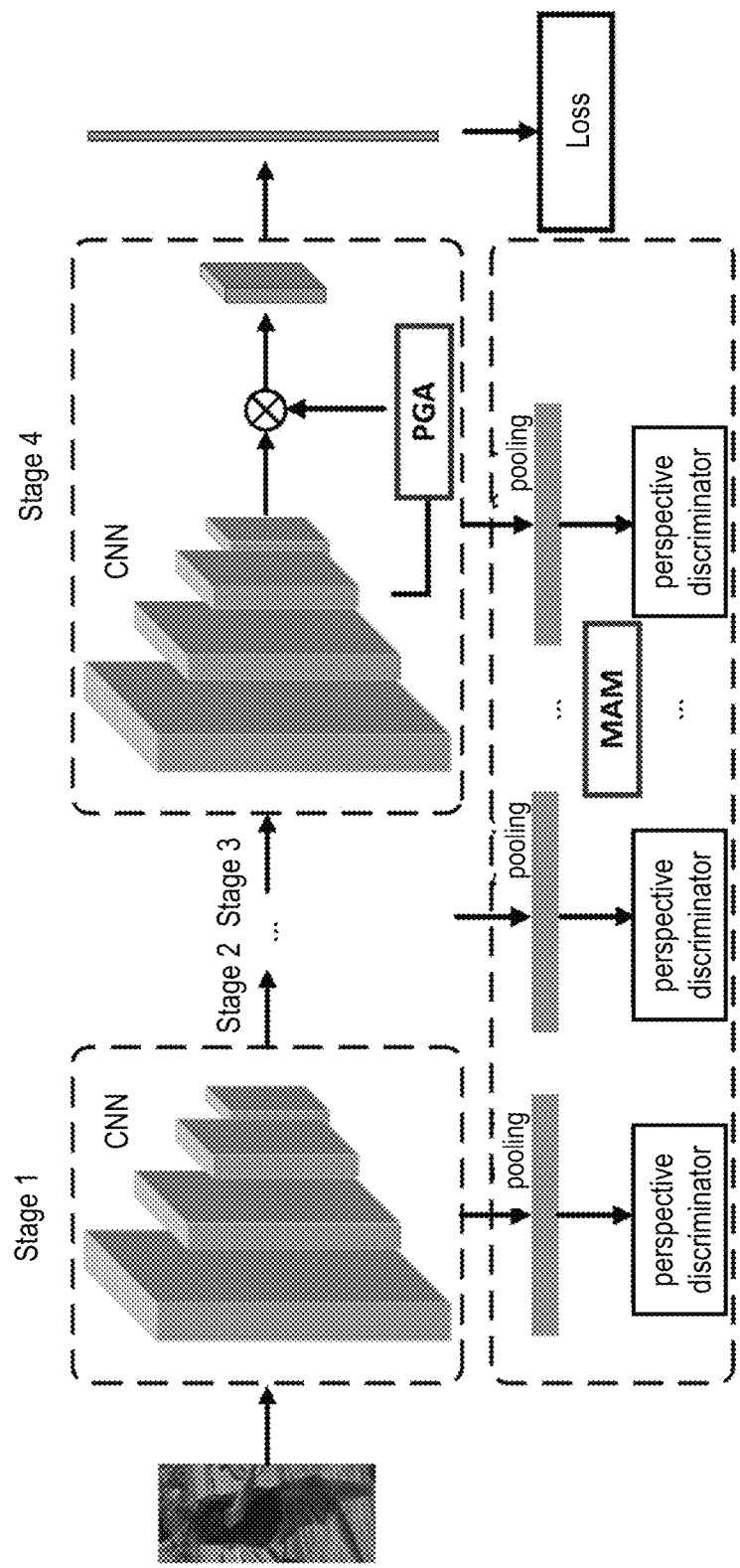
FIG. 1 is the deep convolution neural network that the present invention proposes.

Below in conjunction with accompanying drawing and embodiment, the present invention will be further described:

Explanation of Terms query set: a set of images of target persons to be searched
gallery set: a set of images of all persons
Softmax: a normalized exponential function
Rank1 and mAP: Two evaluation indicators in the field of person re-identification The present invention builds a network combined with an attention mechanism supervised by perspective information in an adversarial manner. Because of the limitations of the current attention mechanism, in the present invention, the camera ID information is used to guide the learning of the attention mechanism, and the areas with salience and perspective invariance are screened (salience refers to the most informative and discriminative areas in person images); In the present invention, it is also used to supervise the learned features at each layer of the network in an adversarial way so that the perspective invariance of the features can be further strengthened.

The person re-identification method based on the perspective-guided multi-adversarial attention mechanism of the present invention includes the following steps:

Step 1. Build a Deep Convolutional Neural Network

The network structure construction of the present invention is mainly based on the PyTorch platform, and the basic network construction adopts the most basic ResNet50 structure. The addition and definition of layers follow various operations within PyTorch. The constructed deep convolutional neural network model is shown in FIG. 1, which mainly includes feature learning module, the multi-adversarial module (denoted as "MAM" in FIG. 1), and the perspective-guided attention mechanism module (denoted as "PGA" in FIG. 1):

The feature learning module uses three baseline models for feature generation. (1) IDE/PCB model: "Beyond part models: Person retrieval with refined part pooling (and a strong convolutional baseline), Sun, Y., Zheng, L., Yang, Y., Tian, Q., Wang, S. Proceedings of the European Conference on Computer Vision (ECCV). 2018: 480-496". The model performs fine-grained local pooling on the feature map to generate person features that take both local and global characteristics into account. (2) AGW model: "Deep learning for person re-identification: A survey and outlook, M. Ye, J. Shen, G. Lin, T. Xiang, L. Shao, and SC Hoi, arXiv preprint arXiv:2001.04193,2020 (note: also referred in IEEE Transactions on Pattern Analysis and Machine Intelligence (TPAMI), 2021)". This model combines non-local attention modules, generalized average pooling, and weighted regular triplets to propose a new basic network for person re-identification.

(3) Fast-reid model: "Fastreid: Apytorch toolbox for general instance re-identification, L. He, X. Liao, W. Liu, X. Liu, P. Cheng, and T. Mei, arXiv preprint arXiv: 2006.02631, 2020". JD AI Institute sorts out the existing basic person re-identification models and integrates commonly used techniques to form a re-identification toolbox. IDE/PCB model, AGW model, and Fast-reid model all use triplet loss and classification loss commonly used in the original model for identity supervision.

As shown in FIG. 1, the multi-adversarial module (denoted as "MAM" in FIG. 1) and the perspective-guided attention mechanism module (denoted as "PGA" in FIG. 1) act on the basic model to strengthen the learning of features, aiming to learn more robust and discriminative features.

The multi-adversarial module acts on the residual blocks of each stage, supervises the features of each stage, and uses the perspective information to classify the pooled features. It is expected that the learned pooled features cannot be distinguished from specific perspectives. It mainly includes classification loss supervision at each stage. The classifier aims to distinguish the features to a specific perspective, while the feature generator aims that the generated feature not be distinguished to a specific perspective.

Figure 2:
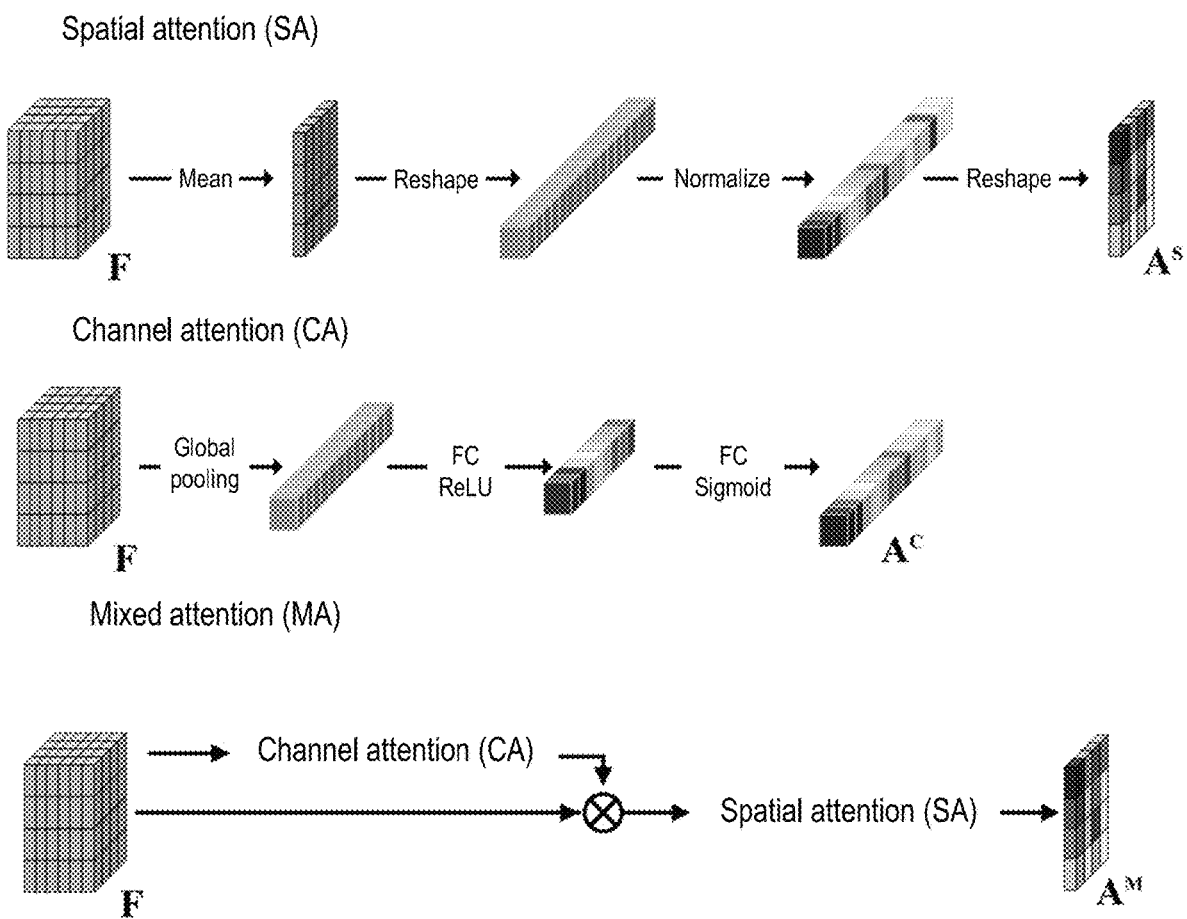
FIG. 2 is the attention map generator that the present invention uses.

The perspective-guided attention mechanism module guides the learning of the attention map with the idea of adversarial. The attention map is multiplied and weighted with the feature map in the last stage, and then the attention map is pooled to obtain the global features. The attention map generator is shown in FIG. 2, which includes three types of attention mechanisms: (1) Spatial attention mechanism (SA) transforms the spatial position of the attention map. (2) Channel attention mechanism (CA) refers to SE-Net ("Squeeze-and-excitation networks, J. Hu, L. Shen, S. Albanie, G. Sun, and E. Wu, IEEE TPAMI, 2019 pp. 1-1") to model the correlation between channels. (3) The mixed attention mechanism (MA) serially combines the Spatial attention mechanism and the Channel attention mechanism, and simultaneously transforms the spatial domain and the channel domain. These three attention mechanisms are used separately, in no order.

Figure 3:
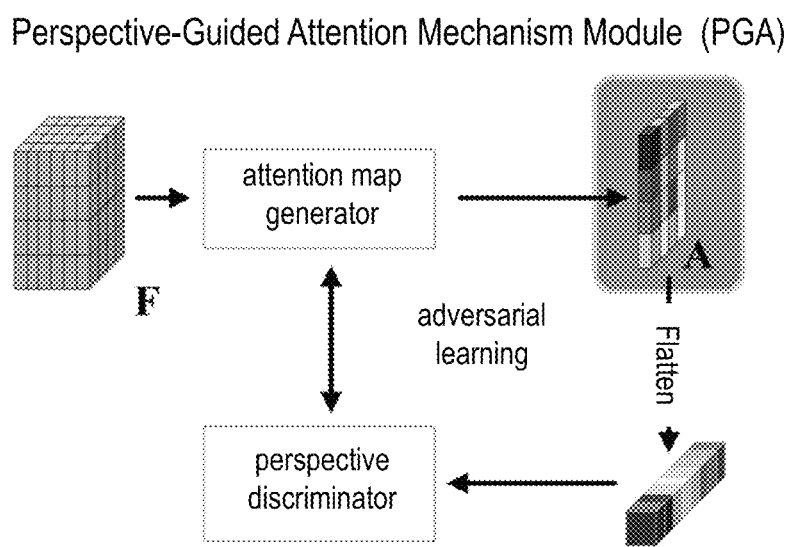
FIG. 3 is the perspective-guided attention mechanism module proposed by the present invention.

FIG. 3 shows a schematic figure of the perspective-guided attention mechanism module, which mainly includes the classification loss supervision of the attention map. The classifier aims to distinguish the attention map to a specific perspective, while the attention map generator aims that the generated attention map not be distinguished to a specific perspective.

Step 2. Training of deep convolutional neural network

1) Data preparation: prepare person images and labels (including person identity labels and camera labels) as training and test images. During the training process, the image data is inputted in batches, the pixel size of the images is set to (384,192), and the batch size is set to 32.

2) Send the training images into the deep convolutional neural network for training.

This step mainly includes the learning of the feature learning module, the learning of the multi-adversarial module, and the learning of the perspective-guided attention mechanism module.

[Learning of the Feature Learning Module]

Refer to the IDE/PCB model, AGW model and Fast-reid model to build the feature learning model, use the same loss as the corresponding model (person identity classification loss $L_{cls}$) for supervision, and the network output is a 2048-dimensional feature vector (a batch of N images output a matrix of N*2048).

[Learning of the Multi-Adversarial Module]

For feature extractors in multiple stages, the present invention measures the perspective invariance of the generated features through the perspective classifier. In one embodiment, the inputted person sample is x, the parameter of the feature extractor is $\theta_f$, the parameter of a perspective classifier is $\theta_d$, the loss of the perspective classifier can be expressed as formula (1):

$$L_d(x, \theta_f, \theta_d) = -\sum_{l=1}^{L}\sum_{i=1}^{N} y^i \log p_l^i \qquad (1)$$

Where $y^i$ represents the perspective label of the i-th person, $p_l^i$ is the softmax probability vector of the i-th person in stage l, N is the number of person images, and L is the number of stages. As a result, the generated features will not be judged to a specific perspective. That is, it is judged that the probability of each perspective is equal, so the adversarial loss of the multi-adversarial module can be written as formula (2), wherein in the actual implementation process, C in formula (2) is the number of cameras that collect person data (for example, if the data is collected by 4 cameras, then C=4).

$$L_{ma}(x, \theta_d, \theta_f) = -\sum_{l=1}^{L}\sum_{i=1}^{N} \frac{1}{C}\log p_l^i \qquad (2)$$

[Learning of the Perspective-Guided Attention Mechanism Module]

The attention map generator is shown in FIG. 2, and the schematic diagram of the perspective-guided attention mechanism module (PGA) is shown in FIG. 3. The perspective classifier aims to divide the attention map to different perspectives In one embodiment, input the attention map x, wherein the parameter of the attention map generator is $\theta_g$, and the parameter of attention map classifier is the $\theta_{ad}$, the loss of the perspective classifier can be expressed as formula (3).

$$L_{ad}(x, \theta_g, \theta_{ad}) = -\sum_{i=1}^{N} y^i \log p^i \qquad (3)$$

wherein $y^i$ and $p^i$ denote the perspective label and softmax probability vector of the i-th attention map, respectively. N is the number of attention maps. As a result, the generated attention map will not be judged to a specific perspective, that is, it is judged that the probability of each perspective is equal. The adversarial loss of the perspective-guided attention mechanism module can be written as formula (4), wherein the selection of C in formula (4) is the same as formula (2):

$$L_{pga}(x, \theta_{ad}; \theta_g) = -\sum_{i=1}^{N} \frac{1}{C}\log p^i \qquad (4)$$

Furthermore, the whole deep convolutional neural network model is composed of learning of the feature learning module, learning of the multi-adversarial module, and learning of the perspective-guided attention mechanism module. The loss solution of the whole model can be expressed as formula (5), wherein $L_{cls}$ is person identity classification loss of IDE/PCB model, AGW model and Fast-reid model, wherein $L_d$ is the loss of the perspective classifier in formula (1), $L_{ma}$ is the adversarial loss of the multi-adversarial module in formula (2), $L_{ad}$ is the loss of the perspective classifier in formula (3), and $L_{pga}$ is the adversarial loss of the perspective-guided attention mechanism module in formula (4). $\lambda_{ma}$ and $\lambda_{pga}$ denote the adjustable loss weights.

$$\min L_{ALL} = L_{cls} + \lambda_{ma}L_{ma} + \lambda_{pga}L_{pga}$$

$$\min L_D = L_d + L_{ad} \qquad (5)$$

3) Network optimization and parameter update

The update of the network mainly includes two parts: forward propagation and reverse update. The built deep convolutional neural network mainly calculates above mentioned various losses through the forward propagation process, and then backpropagates the gradient of the various losses to update the network. It is worth noting that the gradient inversion operation is added to optimize the adversarial network. In adversarial learning, the update of generator parameters and discriminator parameters can be defined as formula (6), wherein L is the number of stages, $\theta_d$ is the parameter of the perspective classifier in formula (1)

and formula (2), $\theta_f$ is the parameter of the feature extractor in formula (1) and formula (2), and y denotes the learning rate.

$$\theta_f \leftarrow \theta_f + \mu\left(\frac{\partial L}{\partial \theta_d}\right) \quad (6)$$

$$\theta_d \leftarrow \theta_d - \mu\left(\frac{\partial L}{\partial \theta_d}\right)$$

Step 3. Testing of Deep Convolutional Neural Network

In the test phase, no network training or parameter update is performed, and the trained model is mainly used for feature extraction and feature matching of test images. Feature map output is obtained after inputting person image into the model, the attention map is obtained by the attention mechanism of the present invention, the attention map is used to weight the feature map, and the final global features are obtained after pooling. Afterward, feature matching is performed with Euclidean distance, and the image with the closest distance to the query image is found in the gallery set. If the person identity of the query image is consistent with the person identity of the image found in the gallery set, the matching is considered successful.

Example

1. Dataset

The present invention uses Market1501 and Duke-MTMC-ReID datasets. The Market1501 dataset was collected from campus scenes and released in 2015. It contains 1501 person identities, captured by 6 cameras. Among them, 12,936 images of 751 person identities are used as the training set, and 19,732 images of 750 person identities are used as the test set. The DukeMTMC-ReID dataset is a subset of the DukeMTMC dataset. Among them, 16,522 images of 702 person identities are used as the training set, and 17,661 images of 702 person identities are used as the test set.

2. Experimental Setup

The learning rate and learning strategy of the network are set the same as those of the three corresponding basic models. Here we mainly introduce the weight setting of the loss function. In the experiment, set $\lambda_{ma}$=0.1, $\lambda_{pga}$=0.1. Experimental hardware platform: 1 GeForce RTX 2080 Ti GPU.

3. Training and Testing Method

Training phase: Input person images in batches, calculate various losses through forward propagation, update network parameters through backpropagation, and obtain the final network model after multiple iterations.

Test phase: Use the trained network model to extract features from the test images and perform feature matching. The process of feature matching can also be regarded as a process of sorting according to the similarity with target persons. Since there are multiple searched persons, the present invention calculates Rank1 and mAP indexes to evaluate the performance of the proposed method. Meaning of the Rank 1 indicator: The percentage that the most similar image to the target person in the search results (the image ranked first) is the correct match (same identity as the target person). Meaning of the mAP: It reflects the average of the correct matching accuracy of all test person images.

4. Comparison of Recognition Accuracy

To verify the effectiveness of the present invention, the present invention is compared with existing person re-identification methods. The existing person re-identification methods mainly include:

(1) MNH-6: B. Chen, W. Deng, and J. Hu, "Mixed high-order attention network for person re-identification," in ICCV, 2019, pp. 371-381.

(2) ABD-Net: T. Chen, S. Ding, J. Xie, Y. Yuan, W. Chen, Y. Yang, Z. Ren, and Z. Wang, "Abd-net: Attentive but diverse person re-identification," in ICCV, 2019, pp. 8351-8361.

(3) BFE: Z. Dai, M. Chen, X. Gu, S. Zhu, and P. Tan, "Batch drop block network for person re-identification and beyond," in ICCV, 2019, pp. 3691-3701.

(4) SCSN: X. Chen, C. Fu, Y. Zhao, F. Zheng, J. Song, R. Ji, and Y. Yang, "Salience-guided cascaded suppression network for person reidentification," in CVPR, 2020, pp. 3300-3310.

(5) AGW: M. Ye, J. Shen, G. Lin, T. Xiang, L. Shao, and S. C. Hoi, "Deep learning for person re-identification: A survey and outlook," arXiv preprint, 2020 (also referred in IEEE Transactions on Pattern Analysis and Machine Intelligence (TPAMI), 2021).

(6) ISP: K. Zhu, H. Guo, Z. Liu, M. Tang, and J. Wang, "Identity-guided human semantic parsing for person re-identification," ECCV, pp. 0-0, 2020.

(7) Fastreid: L. He, X. Liao, W. Liu, X. Liu, P. Cheng, and T. Mei, "Fastreid: Apytorch toolbox for general instance re-identification," arXiv preprint, 2020.

TABLE 1

| Methods | Market1501 | | DukeMTMC-reID | |
|---|---|---|---|---|
| | Rank1 | mAP | Rank1 | mAP |
| MNH-6 | 95.1 | 85.0 | 89.1 | 77.2 |
| ABD-Net | 95.6 | 88.3 | 89.0 | 78.6 |
| BFE | 95.3 | 86.2 | 88.9 | 75.9 |
| SCSN | 95.7 | 88.5 | 83.8 | 58.5 |
| AGW | 95.1 | 87.8 | 89.0 | 79.6 |
| ISP | 95.3 | 88.6 | 89.6 | 80.0 |
| Fastreid | 95.4 | 88.2 | 89.6 | 79.8 |
| Invention (IDE) | 90.4 | 75.4 | 81.6 | 69.9 |
| Invention (PCB) | 94.2 | 81.5 | 85.8 | 72.6 |
| Invention (AGW) | 95.6 | 88.0 | 89.7 | 79.6 |
| Invention (Fast-reid) | 95.8 | 88.7 | 91.0 | 80.8 |

The results in Table 1 reflect the performance of the person re-identification method for searching and correctly matching the target person. It can be seen from Table 1 that the present invention is very easy to integrate into the existing model to improve it and achieve better results. The results obtained by the invention are higher than that of the existing method, and the recognition accuracy is improved. Mainly because of two reasons: 1. The multi-adversarial module used in the present invention optimizes the features of each stage, to finally achieve better feature representations. 2. The perspective-guided attention mechanism module used in the present invention improves attention, thereby improving overall performance.

What is claimed is:

1. A person re-identification method based on a perspective-guided multi-adversarial attention, wherein the method comprises following steps:

step 1. building a deep convolutional neural network, wherein the deep convolutional neural network includes a feature learning module, a multi-adversarial module, and a perspective-guided attention mechanism module; the multi-adversarial module is followed by a global pooling layer and a perspective discriminator after each stage of a basic network of the feature learning module; the perspective-guided attention mechanism module includes an attention map generator and the perspective discriminator;

step 2. training of the deep convolutional neural network, wherein step 2 includes following three sub-steps:
1) data preparation: preparing person images, inputting person images and corresponding identity labels, and dividing the person images into two parts as training images and testing images;
2) sending the training images into the deep convolutional neural network for training, including feature learning, multi-adversarial module learning, and perspective-guided attention mechanism;
3) network optimization and parameter update;

step 3. testing of the deep convolutional neural network, including:
using the trained deep convolutional neural network to extract features of the testing images, and using an Euclidean distance to perform feature matching on images in a query set and images in a gallery set.

2. The method according to claim 1, wherein the feature learning module adopts a ResNet50 structure, wherein the ResNet50 structure includes an IDE/PCB model, an AGW model and a Fast-reid model, and these three models all use their own triplet loss and classification loss for identity supervision.

3. The method according to claim 2, wherein a network output of the feature learning module is a 2048-dimensional feature vector.

4. The method according to claim 2, wherein
in step 2, the learning of the multi-adversarial module is:
adding a global pooling to each residual block of an original feature learning network to obtain each low-level feature, middle-level feature, and high-level feature, and using the perspective discriminator to supervise the low-level feature, the middle-level feature, and the high-level feature, so that the final obtained deep feature representation is more robust, and this part uses a perspective classification loss to supervise the low-level feature, the middle-level feature, and the high-level feature.

5. The method according to claim 4, wherein the loss of a perspective classifier is:

$$L_d(x, \theta_f; \theta_d) = -\sum_{l=1}^{L}\sum_{i=1}^{N} y^i \log p_l^i$$

wherein, the inputted person sample is x, the parameter of a feature extractor is $\theta_f$, the parameter of the perspective classifier is $\theta_d$, $y^i$ represents a perspective label of the i-th person, $p_l^i$ is a softmax probability vector of the i-th person in a stage l, N is a number of the person images, and L is a number of stages.

6. The method according to claim 2, wherein
in step 2, the perspective-guided attention mechanism module adds an attention mechanism on a basis of an original deep feature learning network, and supervises the learning of the perspective-guided attention mechanism module, so that a generated attention map can better capture rich semantic information and regions that are resistant to perspective changes, wherein this part uses a perspective classification loss to supervise the attention map.

7. The method according to claim 6, further comprising:
inputting the attention map x, wherein a parameter of the attention map generator is $\theta_g$, a parameter of an attention map classifier is $\theta_{ad}$, and the loss of a perspective classifier can be expressed:

$$L_{ad}(x, \theta_g; \theta_{ad}) = -\sum_{i=1}^{N} y^i \log p^i$$

wherein $y^i$ and $p^i$ denote a perspective label and a softmax probability vector of the i-th attention map, respectively, and N is a number of attention maps.

8. The method according to claim 2, wherein
in step 2, the update of the network parameter includes two parts: forward propagation and backward propagation update, a built network model calculates various losses through a forward propagation process, and then backpropagates a gradient of the various losses to update the network.

* * * * *